(12) United States Patent
Wang et al.

(10) Patent No.: US 8,638,840 B2
(45) Date of Patent: Jan. 28, 2014

(54) COST-EFFECTIVE LINEARIZATION FOR WIRELESS COMMUNICATION

(75) Inventors: Hans Wang, Mountain View, CA (US); Binglei Zhang, San Jose, CA (US); Tao Li, Campbell, CA (US); Shih Hsiung Mo, San Jose, CA (US)

(73) Assignee: Aviacomm Inc., Santa Clara, CA (US)

( * ) Notice: Subject to any disclaimer, the term of this patent is extended or adjusted under 35 U.S.C. 154(b) by 70 days.

(21) Appl. No.: 13/325,269

(22) Filed: Dec. 14, 2011

(65) Prior Publication Data

US 2013/0156078 A1   Jun. 20, 2013

(51) Int. Cl.
  *H04B 1/38* (2006.01)
(52) U.S. Cl.
  USPC ........................................... 375/221
(58) Field of Classification Search
  USPC ......... 375/285, 295–297, 221; 455/501, 63.1, 455/67.13
  See application file for complete search history.

(56) References Cited

U.S. PATENT DOCUMENTS

| 7,787,566 | B2* | 8/2010 | Chan et al. | 375/297 |
| 8,295,396 | B2* | 10/2012 | Waheed et al. | 375/297 |
| 2008/0049868 | A1* | 2/2008 | Brobston | 375/297 |
| 2012/0196546 | A1* | 8/2012 | Ly-Gagnon | 455/73 |

* cited by examiner

*Primary Examiner* — Khanh C Tran
(74) *Attorney, Agent, or Firm* — Shun Yao; Park, Vaughan, Fleming & Dowler LLP

(57) ABSTRACT

One embodiment of the present invention provides a transceiver for wireless communication. The transceiver includes a transmitting circuit, a receiving circuit, a power amplifier coupled to the transmitting circuit, and a looping mechanism configured to establish a closed loop that couples an output of the power amplifier to an input of the receiving circuit in response to a linearity compensation need, thereby facilitating cost-effective linearity compensation.

10 Claims, 2 Drawing Sheets

COST-EFFECTIVE LINEARIZATION FOR WIRELESS COMMUNICATION

BACKGROUND

1. Field

The present disclosure relates generally to a radio circuit used in wireless communication systems. More specifically, the present disclosure relates to a radio circuit with linearization-compensation capability.

2. Related Art

A recent decision of the Federal Communications Commission (FCC) has allowed unlicensed broadcasting devices access to "white spaces" in the television spectrum, prompting the development of the "WhiteFi" technology and white-spaces devices. Unlike traditional WiFi, which operates most commonly at 2.4 GHz and 5.0 GHz, white-spaces devices operate over 30 separate 6 MHz TV channels (freed after the conversion to digital TV) in the ultra-high frequency band (UHF). In order to protect licensed TV broadcasters from harmful interference, the FCC has required that the level of interference from adjacent channels needs to be less than −55 dBm. This requirement limits the amount of distortion or nonlinearity that can be tolerated by the power amplifier (PA), because an amplifier that compresses its input or has a non-linear input/output relationship causes the output signal to splatter onto adjacent frequencies. In addition, to ensure good power efficiency of a device, it is important to maintain the linearity of the transmitter over a large dynamic range.

The linearity of a device can be improved by implementing a linearization algorithm based on a closed-loop system. Conventional technologies form a closed loop by building an off-chip feedback path, which is costly and impractical for compact mobile devices.

SUMMARY

One embodiment of the present invention provides a transceiver for wireless communication. The transceiver includes a transmitting circuit, a receiving circuit, a power amplifier coupled to the transmitting circuit, and a looping mechanism configured to establish a closed loop that couples an output of the power amplifier to an input of the receiving circuit in response to a linearity compensation need, thereby facilitating cost-effective linearity compensation.

In a variation on this embodiment, the transmitting circuit and the receiving circuit are located on a same integrated circuit (IC) chip.

In a variation on this embodiment, the looping mechanism includes an attenuator situated between the power amplifier and the receiving circuit.

In a variation on this embodiment, the transceiver further includes a detector configured to detect an environmental change which triggers the linearity compensation need.

In a further variation, the detector is a temperature sensor.

In a variation on this embodiment, the transceiver further includes a digital signal processor (DSP) configured to run a linearity-compensation algorithm based on the closed loop.

In a further variation, the DSP is further configured to generate a pre-distortion signal that can be used to pre-distort a baseband signal before the baseband signal is modulated by the transmitting circuit and amplified by the power amplifier.

DETAILED DESCRIPTION

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not limited to the embodiments shown, but is to be accorded the widest scope consistent with the principles and features disclosed herein.

Overview

Embodiments of the present invention provide a solution for on-chip linearity compensation of a wireless transceiver. Instead of relying on off-chip components to build a feedback path, embodiments of the present invention provide a solution that leverages existing components in the transceiver integrated circuit (IC) chip to form the major portion of the closed loop for linearity compensation, thus being suitable for portable mobile devices.

On-Chip Linearity Compensation

In wireless systems, linearity is a very important characteristic directly contributing to overall system performance, especially in terms of power efficiency. However, the linearity of the power amplifier (PA) is not ideal. Moreover, environmental changes, such as temperature variations, also negatively impact the PA linearity. One effective method of PA linear compensation is to pre-distort the signal before sending it to the PA. Such technology requires the establishment of a closed loop. Conventional technologies rely on building an external (off-chip) feedback path to form the closed loop.

Figure 1:
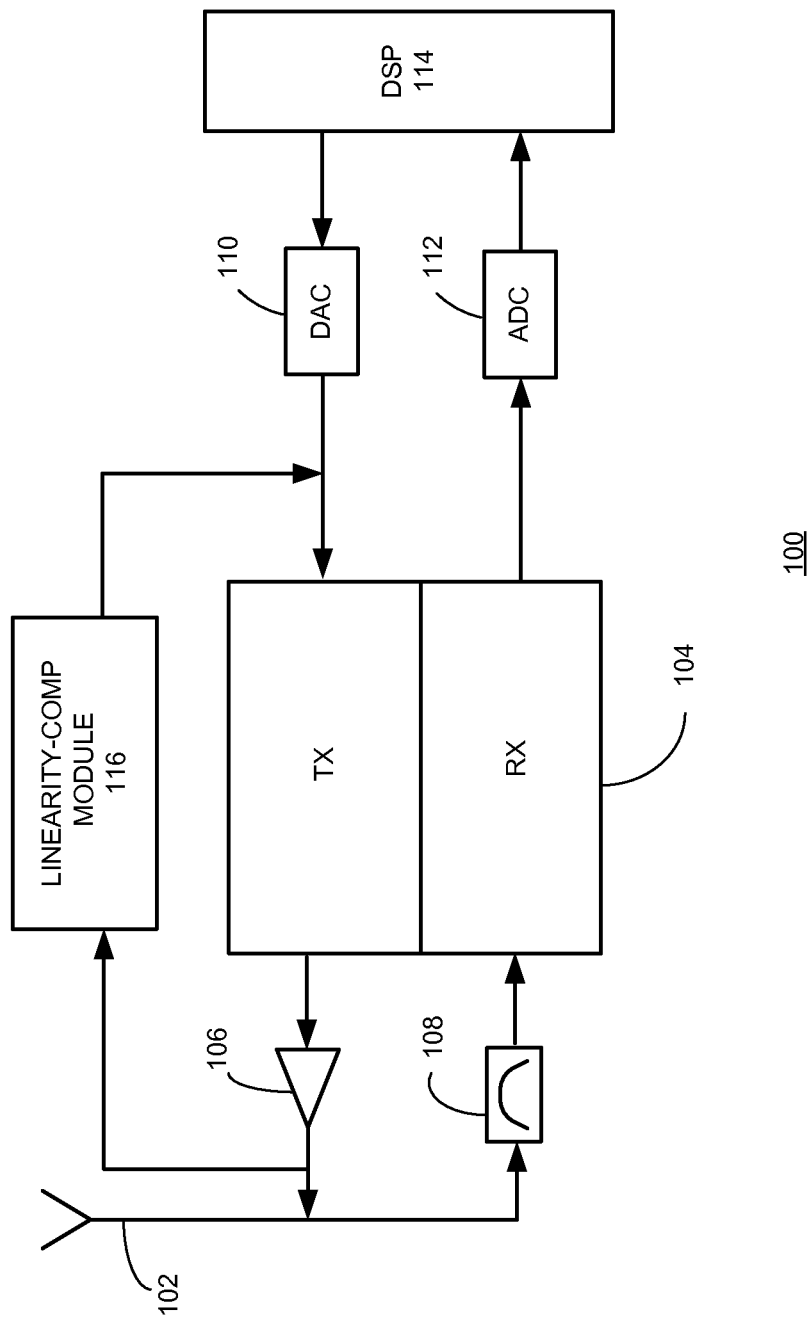
FIG. 1 presents a diagram illustrating the architecture of a conventional transceiver with linearity compensation (prior art).

FIG. 1 presents a diagram illustrating the architecture of a conventional transceiver with linearity compensation (prior art). Transceiver 100 includes an antenna 102, an RF integrated circuit (IC) chip 104, a PA 106, a band-pass filter (BPS) 108, a digital-to-analog converter (DAC) 110, an analog-to-digital converter (ADC) 112, a digital signal processor (DSP) 114, and a linearity-compensation module 116.

During operation, DAC 110 converts a digital baseband signal to the analog domain before sending it to the transmitter portion of RF IC chip 104, which performs the functions of modulating and pre-amplification. The pre-amplified signal is amplified again by PA 106 before it is sent to antenna 102 for transmission. In order to compensate for the nonlinearity of PA 106, a closed loop is constructed to include the transmitter (TX) portion (which often includes a modulator, a low-pass filter (LPF), and a pre-amplifier) of RF IC chip 104, power amplifier 106, and linearity-compensation module 116. More specifically, linearity-compensation module 116 uses the output of PA 106 to generate a compensation signal that controls the pre-distortion of the signal sent to PA 106. Note that linearity-compensation module 116 can be obtained separately from RF IC chip 104. However, the inclusion of an off-chip linearity-compensation module often adds the manufacture cost and increases the size of the transceiver, making this solution less ideal for a compact mobile device. Note that BPS 108, the receiver (RX) portion (which often includes a demodulator and a LPF) of RF IC chip 104, and ADC 112 together perform the receiving function.

Figure 2:
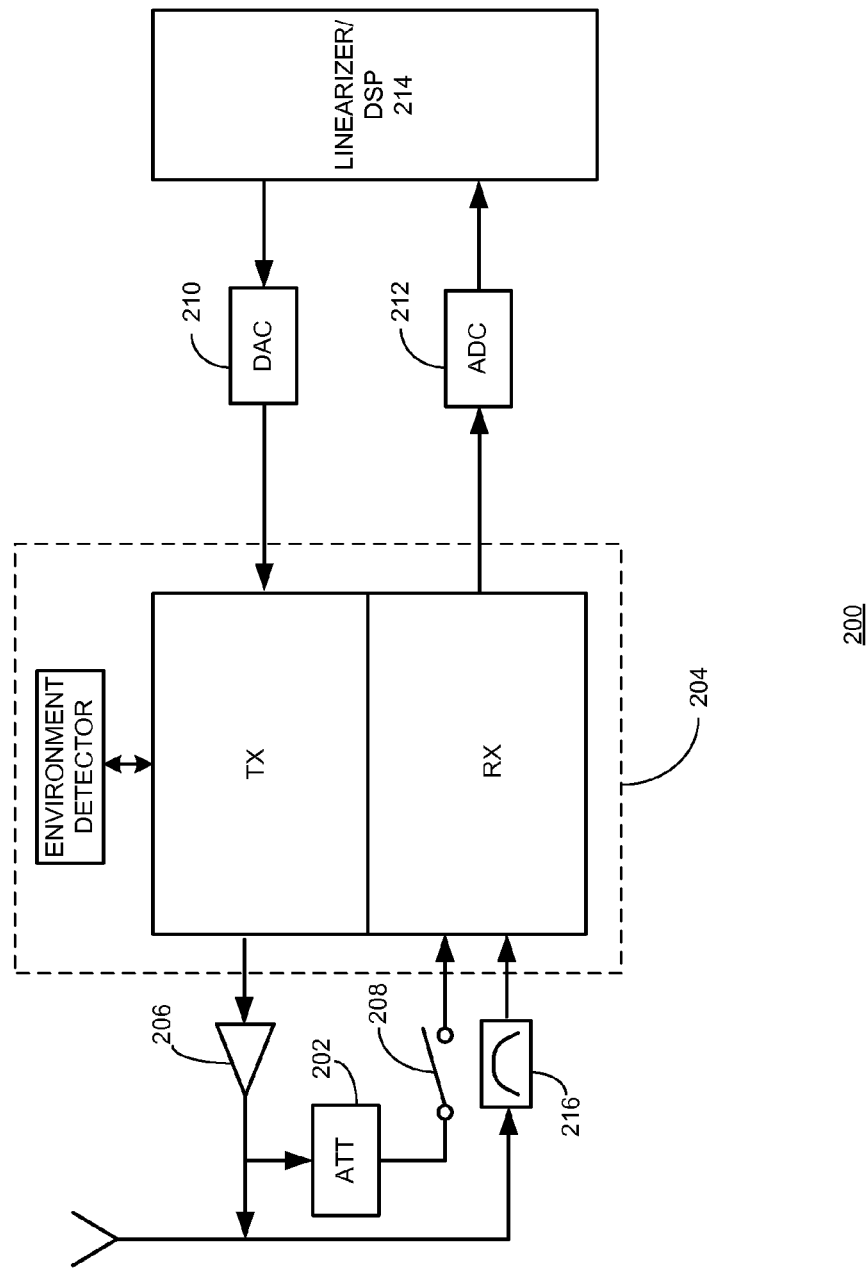
FIG. 2 presents a diagram illustrating the architecture of a transceiver with on-chip linearity compensation, in accordance with an embodiment of the present invention.

FIG. 2 presents a diagram illustrating the architecture of a transceiver with on-chip linearity compensation, in accordance with an embodiment of the present invention. The structure of transceiver 200 is similar to that of transceiver 100, except that transceiver 200 does not include an off-chip linearity-compensation module; instead, the output of PA 206 is fed back to the RX portion of RF IC chip 204 via an attenuator 202 and an on/off switch 208. Note that attenuator 202 prevents damages to or saturation of the RX of RF IC chip 204 that may be caused by the high-power input.

While transceiver 200 is in the normal operation mode, switch 208 remains open, and the TX and RX portions of transceiver 200 perform normal transmitting and receiving. In one embodiment, RF IC chip 204 includes wideband modulators/demodulators, a wideband pre-amplifier, and tunable LPFs. In other words, RF IC chip 204 is capable of working at various frequency bands. In a further embodiment, PA 206 includes a set of PAs, each optimized for a particular frequency band. Depending on the current standard, one of the PAs is selected for amplification. Similarly, BPF 216 can be programmable to enable the transceiver 200 to receive RF signals over a wide range of frequency bands.

While transceiver 200 is in the linearity-compensation mode (before the initial use of transceiver 200 is triggered by the detection of environmental change), switch 208 is closed, and a closed loop is formed, which includes the TX portion of RF IC chip 204, PA 206, attenuator 202, the RX portion of RF IC chip 204, ADC 212, DSP 214, and DAC 210. Note that DSP 214 now includes a linearizer that is configured to run a linearization algorithm based on the transmitted and received signals. In one embodiment, a linearity-test signal is generated by linearizer/DSP 214. This linearity-test signal goes through the closed loop to be transmitted and received. Based on the received signal, linearizer/DSP 214 runs the linearization algorithm to determine the amount of pre-distortion needed to realize the linearity compensation.

Once the amount of pre-distortion is determined, transceiver 200 can return to its normal operation mode by opening switch 208. Any future transmissions will include the pre-distortion of the baseband signal before the signal is modulated by the modulator and amplified by PA 206.

Note that this linearity-compensation scheme relies on a closed loop that is formed mostly by on-chip components (the TX and RX of RF IC chip 204). In addition, the linearization algorithm can be implemented by an existing baseband DSP, such as DSP 214. Hence, no additional off-chip linearity-compensation module is needed, making this solution ideal for portable mobile devices.

The schematic shown in FIG. 2 is merely exemplary and should not limit the scope of this disclosure. In general, embodiments of the present invention provide a solution that enables on-chip linearity compensation. Other circuit configurations are also possible. In one embodiment, transceiver 200 can include an on-chip (located on RF IC chip 204) temperature sensor configured to detect temperature change. If the temperature change exceeds a threshold value, transceiver 200 enters the linearity-compensation mode. In a further embodiment, transceiver 200 may enter the linearity-compensation mode regularly over predetermined time intervals.

The foregoing descriptions of embodiments of the present invention have been presented only for purposes of illustration and description. They are not intended to be exhaustive or to limit this disclosure. Accordingly, many modifications and variations will be apparent to practitioners skilled in the art. The scope of the present invention is defined by the appended claims.

What is claimed is:

1. A transceiver for wireless communication, comprising:
   a transmitting circuit;
   a receiving circuit;
   a power amplifier coupled to the transmitting circuit;
   a detector configured to detect an environmental change; and
   a switching mechanism configured to, in response to the detected environmental change exceeding a predetermined threshold, switch an output of the power amplifier to couple to an input of the receiving circuit, thereby facilitating cost-effective linearity compensation.

2. The transceiver of claim 1, wherein the transmitting circuit and the receiving circuit are located on a same integrated circuit (IC) chip.

3. The transceiver of claim 1, further comprising an attenuator situated between the output of the power amplifier and the input of the receiving circuit.

4. The transceiver of claim 1, wherein the detector is a temperature sensor.

5. The transceiver of claim 1, further comprising a digital signal processor (DSP) configured to run a linearity-compensation algorithm based on a closed loop that includes the transmitting circuit, the power amplifier, and the receiving circuit.

6. The transceiver of claim 5, wherein the DSP is further configured to generate a pre-distortion signal that can be used to pre-distort a baseband signal before the baseband signal is modulated by the transmitting circuit and amplified by the power amplifier.

7. A method for linearity compensation of a wireless transceiver that includes a transmitter, a receiver, and a power amplifier coupled to the transmitter, comprising:
   detecting an environmental change;
   receiving a linearity-compensation trigger signal in response to the detected environmental change exceeding a predetermined threshold;
   in response to receiving the linearity-compensation trigger signal, forming a closed loop using the transmitter, the receiver, and the power amplifier, wherein the closed loop is configured to feed an output of the power amplifier to an input of the receiver; and
   generating a pre-distortion signal that can be used to pre-distort a baseband signal before the baseband signal is modulated by the transmitter and amplified by the power amplifier, thereby enabling linearity compensation for the power amplifier.

8. The method of claim 7, further comprising attenuating the output of the power amplifier.

9. The method of claim 7, wherein the environmental change includes a temperature change.

10. The method of claim 7, wherein generating the pre-distortion signal involves running a linearity-compensation algorithm based on the closed loop.

* * * * *